US010284631B2

(12) United States Patent
Jiang et al.

(10) Patent No.: US 10,284,631 B2
(45) Date of Patent: May 7, 2019

(54) MANAGEMENT-AS-A-SERVICE FOR ON-PREMISES INFORMATION-TECHNOLOGY SYSTEMS

(71) Applicants: Louie Jiang, Sunnyvale, CA (US); Girish Thombare, San Jose, CA (US); Hongxing Li, Palo Alto, CA (US); Dmitry Korotkov, Union City, CA (US)

(72) Inventors: Louie Jiang, Sunnyvale, CA (US); Girish Thombare, San Jose, CA (US); Hongxing Li, Palo Alto, CA (US); Dmitry Korotkov, Union City, CA (US)

(73) Assignee: VMware, Inc., Pala Alto, CA (US)

( * ) Notice: Subject to any disclaimer, the term of this patent is extended or adjusted under 35 U.S.C. 154(b) by 231 days.

(21) Appl. No.: 15/182,438

(22) Filed: Jun. 14, 2016

(65) Prior Publication Data

US 2017/0104639 A1    Apr. 13, 2017

Related U.S. Application Data

(63) Continuation-in-part of application No. 14/971,872, filed on Dec. 16, 2015.
(Continued)

(51) Int. Cl.
*H04L 12/24*    (2006.01)
*H04L 29/06*    (2006.01)
*H04L 29/08*    (2006.01)

(52) U.S. Cl.
CPC ............ *H04L 67/10* (2013.01); *H04L 41/022* (2013.01); *H04L 41/04* (2013.01); *H04L 41/5041* (2013.01); *H04L 67/02* (2013.01); *H04L 67/04* (2013.01); *H04L 67/42* (2013.01); *H04L 69/16* (2013.01); *H04L 69/22* (2013.01); *H04L 63/029* (2013.01); *H04L 63/08* (2013.01); *H04L 63/102* (2013.01)

(58) Field of Classification Search
CPC .......... H04L 41/14; H04L 43/06; H04L 43/04
See application file for complete search history.

(56) References Cited

U.S. PATENT DOCUMENTS 7,545,780 B2    6/2009  Chitrapu
8,626,891 B2    1/2014  Guru et al.
(Continued)

*Primary Examiner* — Nam T Tran
(74) *Attorney, Agent, or Firm* — Clifton Leon Anderson

(57) ABSTRACT

A Management-as-a-Service (MaaS) agent running on a SOPS creates collecting management statistics relating to the health, utilization, and performance of a subscriber on-premises system (SOPS). The MaaS agent forwards the collected data to a MaaS server, which stores the data in association with a tenant identifier (TID) in a multi-tenant database. The MaaS server tags user queries with the TID, so that the query result is based on management data for the respective SOPS, to the exclusion of SOPS associated with different TIDs. The use of multi-tenant techniques with non-multi-tenant SOPS allows one MaaS to manage plural SOPS while maintaining isolation of the management data for the respective SOPS. In addition, the use of multi-tenant techniques allows SOPS to be managed together with cloud-based subscriber applications, facilitating common management of hybrid cloud and on-premises systems.

14 Claims, 9 Drawing Sheets

Related U.S. Application Data

(60) Provisional application No. 62/240,075, filed on Oct. 12, 2015.

(56) References Cited

U.S. PATENT DOCUMENTS

| | | |
|---|---|---|
| 8,661,132 B2 | 2/2014 | Dorai et al. |
| 8,782,794 B2 | 7/2014 | Ramcharran |
| 8,875,237 B2 | 10/2014 | Engdahl et al. |
| 9,929,969 B1 * | 3/2018 | Krottapalli ............... H04L 47/70 |
| 2004/0098623 A1 * | 5/2004 | Scheidell ................ H04L 43/00 |
| | | 726/23 |
| 2007/0127496 A1 | 6/2007 | Tjandra |
| 2011/0258432 A1 | 10/2011 | Rao |
| 2012/0110156 A1 * | 5/2012 | Guru .................... H04L 67/125 |
| | | 709/223 |

* cited by examiner

MANAGEMENT-AS-A-SERVICE FOR ON-PREMISES INFORMATION-TECHNOLOGY SYSTEMS

This application is a continuation-in-part (CIP) of copending patent application Ser. No. 14/971,872 filed 2015 Dec. 16. This application claims priority based on provisional application 62/240,075 filed 2015 Oct. 12.

BACKGROUND

Small and medium-sized businesses (SMBs) typically use on-premises information-technology (IT) systems. Responsibility for installing, configuring, maintaining, updating, and upgrading the IT systems is often borne by an owner or employee who has other responsibilities and, thus may have limited time and expertise to address IT problems. If the responsible person is working off site, on vacation, or ill, business operations may suffer extended interruptions until the responsible person returns. If the responsible person leaves the company, their familiarity with the existing on-premises system may take time to replace.

One increasingly attractive alternative is to host some or all IT tasks in the cloud. For example, Infrastructure-as-a-Service (IaaS) providers allow (SMB) subscribers to specify an IT system. The IaaS provider then provides a virtual computer system meeting the SMB subscriber's specifications. The IaaS provider takes responsibility for managing IT hardware, relieving the SMB customer of the same.

A typical IaaS provider owns or otherwise possesses a physical infrastructure, e.g., one or more data centers. The physical infrastructure is virtualized so that the resources (processors, memory, communications bandwidth, etc.) of the physical infrastructure can be shared among plural virtual infrastructures. Each of the virtual infrastructures can be leased to an IaaS subscriber. Because the subscribers' virtual infrastructure share the same physical infrastructure, the IaaS subscribers are, in effect, multiple tenants of the cloud system and its physical infrastructure.

Advantages to such multi-tenancy arrangements include the dynamic allocation of physical infrastructure resources among virtual infrastructures according to demand; such dynamic allocation provides for a much more efficient use of available resources than is typically attained by on-premises IT systems. Also, multi-tenancy arrangements can take advantage of pooled knowledge. Virtual-infrastructure configurations developed to meet the requirements of one tenant can serve as blueprints or templates to meet similar requirements by future tenants. A solution to one tenant's problem, e.g., a malicious malware intrusion, may be applied across the board to harden all tenants. Also, a solution for one tenant may add to a knowledgebase accessible by other tenants to solve their similar problems. In addition, since the subscriber applications are based in the cloud, they can be managed from anywhere, e.g., from home and from travel locations.

However, multi-tenancy arrangements can introduce some security risks. Normal risks include physical access from an SMB tenant location or over the Internet. However, a hacker, for example, could access one tenant's virtual infrastructure and use it as a base to access another's virtual infrastructure via the common physical infrastructure. It would be hard to identify in advance all forms of inter-infrastructure vulnerabilities, especially if dynamic resource allocation is employed. Accordingly, some SMEs continue to maintain on-premises IT systems for at least some of their IT needs.

DETAILED DESCRIPTION

The present invention provides a Management-as-a-Service (MaaS) system with multi-tenancy features to provide some of the advantages of multi-tenancy to subscriber on-premises systems (which are typically not multi-tenancy). The MaaS system can manage plural subscriber on-premises systems (SOPSs) for respective MaaS subscribers. For each managed SOPS, management (e.g., health, performance, utilization, and configuration) data is tagged with respective tenant identifiers (TIDs) and is stored in association with the TIDs in a multi-tenant database. Manager-user queries are tagged with respective TIDs so that management data for the respective SOPS can be accessed, while access management data for non-respective SOPS is precluded.

Since SOPS are not typically leased, let alone leased to multiple tenants, their owners are not literally tenants. Nonetheless, the MaaS subscribers are assigned respective tenant identifiers (TIDs), just as they would be if they subscribed to IaaS services to operate a subscriber application in the cloud. The assignment of TIDs enables the use of multi-tenant technologies to enhance MaaS services to SOPS.

Each SOPS hosts a management agent that tags data collected from the SOPS with the respective TID. Management data collected from a SOPS, is stored in association with the respective TID so that management data in the multi-tenant database can be distinguished by its SOPS source. With appropriate permissions, an analysis engine of the MaaS server can provide aggregate statistics and knowledgebase items that may be made available to multiple subscribers, e.g., to anticipate problems and suggest solutions.

The MaaS server, which is Internet-based and located outside the SOPS, includes a user authentication system that identifies users and associates them with respective MaaS subscribers. Queries from users can then be tagged with respective Tins. A database engine ensures that user queries access like TID data, to the exclusion of management data associated with other Tins (and thus with other SOPS and subscribers).

The MaaS multi-tenancy features allow a manager-user for a subscriber to: 1) remotely manage the respective SOPS; 2) query respective management data stored in the multi-tenant database; and 3) access aggregate data and knowledgebase items. The user authentication function precludes: 1) a manager-user for a SOPS from accessing non-respective SOPSs; and 2) a manager-user for a SOPS from querying non-respective management data stored in the multi-tenant database. For each SOPS, production data is protected by the security provided for each respective SOPS; there may be no access to production data via the MaaS. Thus, the present invention provides for both remote management and management data isolation for subscribers and their SOPS.

Figure 1A:
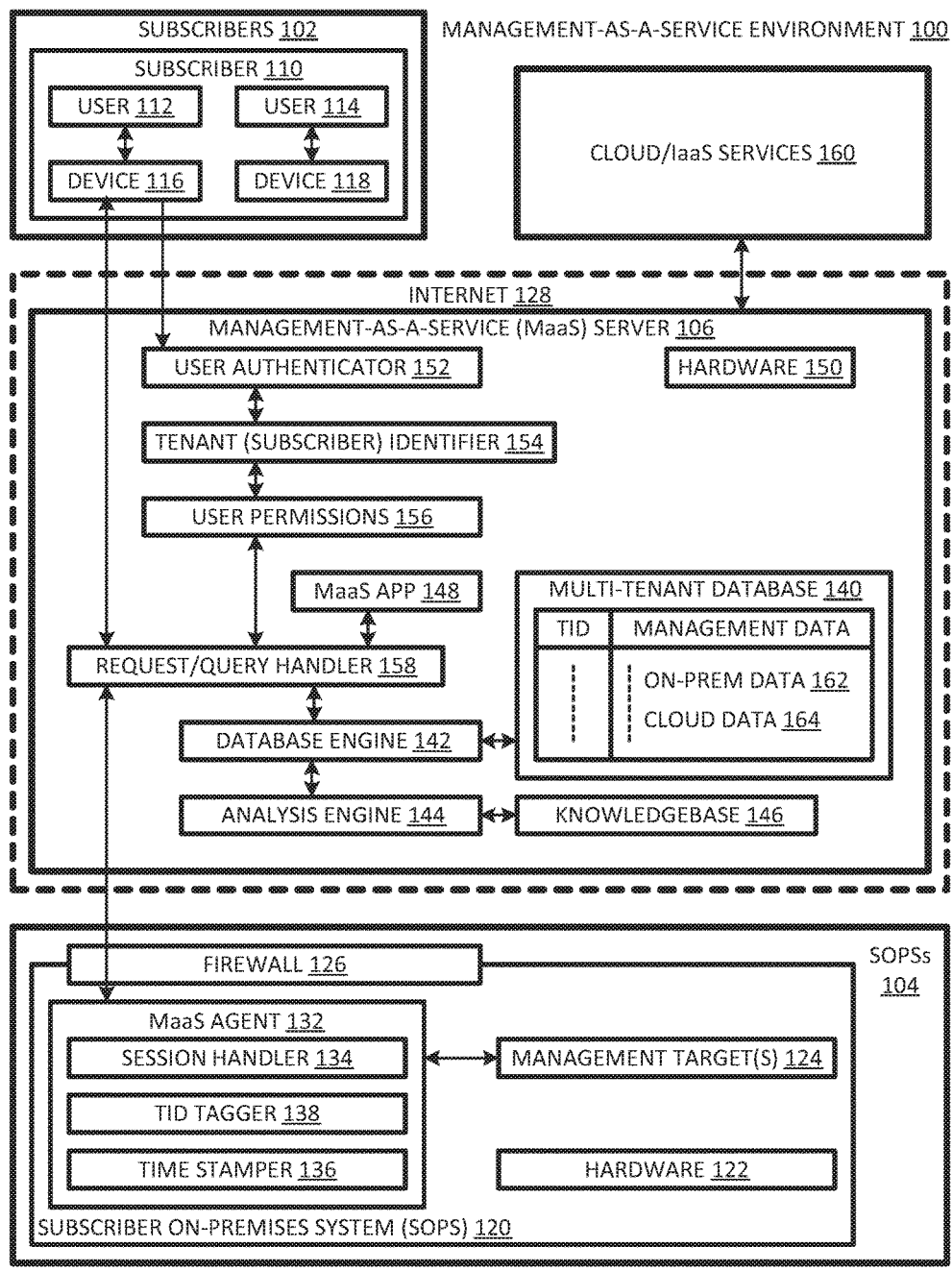
FIG. 1A is a schematic diagram of a Management-As-A-Service (MaaS) environment with multi-tenancy features used to manage subscriber on-premises systems (SOPS).

As shown in FIG. 1A, a Management-As-A-Service (MaaS) environment 100 includes subscribers 102, their respective SOPS 104, and an Internet-based MaaS server 106. Subscribers 102 can include a subscriber 110. Each subscriber can include one or more manager-users, who can be owners, employees, etc., that can manage the respective SOPS via MaaS server 106. For example, subscriber 110 includes manager-users 112 and 114, who can access MaaS server 106 using respective devices 116 and 118. The devices can be desktop computers, laptop computers, tablets, smartphones, etc.

Each SOPS 104 belongs to a respective subscriber. For example, SOPS 120 belongs to subscriber 110. Each SOPS includes hardware 122 for executing software to achieve the functionality described below. The hardware can include one or more computers, as well as networking gear. Each SOPS 104 includes one or more management targets to be managed using MaaS server 106. For example, SOPS 120 includes a management target 124. Management target 124 can be, for example, a hypervisor running on hardware 122 to support and monitor one or more virtual machines. In addition, SOPS 104 can include respective firewalls, such as firewall 126 for SOPS 120, to protect the respective SOPS from intrusions, e.g., over Internet 128.

Each SOPS includes a MaaS agent, such as MaaS agent 132 for SOP 120, which is provided by the MaaS vendor with the subscription to MaaS services. Each MaaS agent includes a session handler 134 for handling communications with MaaS server 106. The communications can include receiving management commands from MaaS server 106 and transmitting management (health, utilization, performance, and/or configuration) data to MaaS server 106. A time stamper 136 time-stamps management data with collection times, while a TID tagger 138 tags the management data with a tenant identifier to distinguish one SOPS source from another.

Management data sent to MaaS server 106 can be stored in multi-tenant database 140 by database engine 142. The management data is keyed by TID to allow for data isolation among SOPSs. Management data can also be forwarded to analysis engine 144 to form statistical summary data, which may also be stored in database 140. If analysis engine 144 detects a present or potential problem, it can send an alert and, in some cases, a recommendation to the respective subscriber. Recommendations can be based on information obtained from knowledge base 146. In some cases, the notice and/or recommendation can be sent to MaaS app 148, which can automatically direct MaaS agent to take corrective action.

MaaS server 106 includes hardware 150 for executing software defining the components and functionality of MaaS server 106. User authenticator 152 verifies the identities of users, e.g., user 112 trying to access MaaS server 106. For example, a password can be used for authentication. Based on the authentication, tenant identifier 154 identifies the subscriber to which the user belongs and tags the users request or query with the tenant identifier (TID) for the associated subscriber. The TID determines which SOPS can be managed by the user. User permissions 156 determine which role-dependent actions may be taken by the identified user on behalf of the respective subscriber.

Request handler 158 forwards user requests to respective SOPs. Request handler 158 forwards user queries to database engine 142 to access data from database 140. Generally, the query response is limited to data associated with the same TID as the request.

One advantage of using a multi-tenant database and other multi-tenant techniques is that MaaS server 106 can be used to manage IaaS and other cloud services 160. For subscribers to hybrid cloud services database 140 can store on-premises data 162 and cloud data 164 together. Thus, MaaS server 106 provides for on-premises, cloud, and hybrid IT solutions.

Figure 1B:
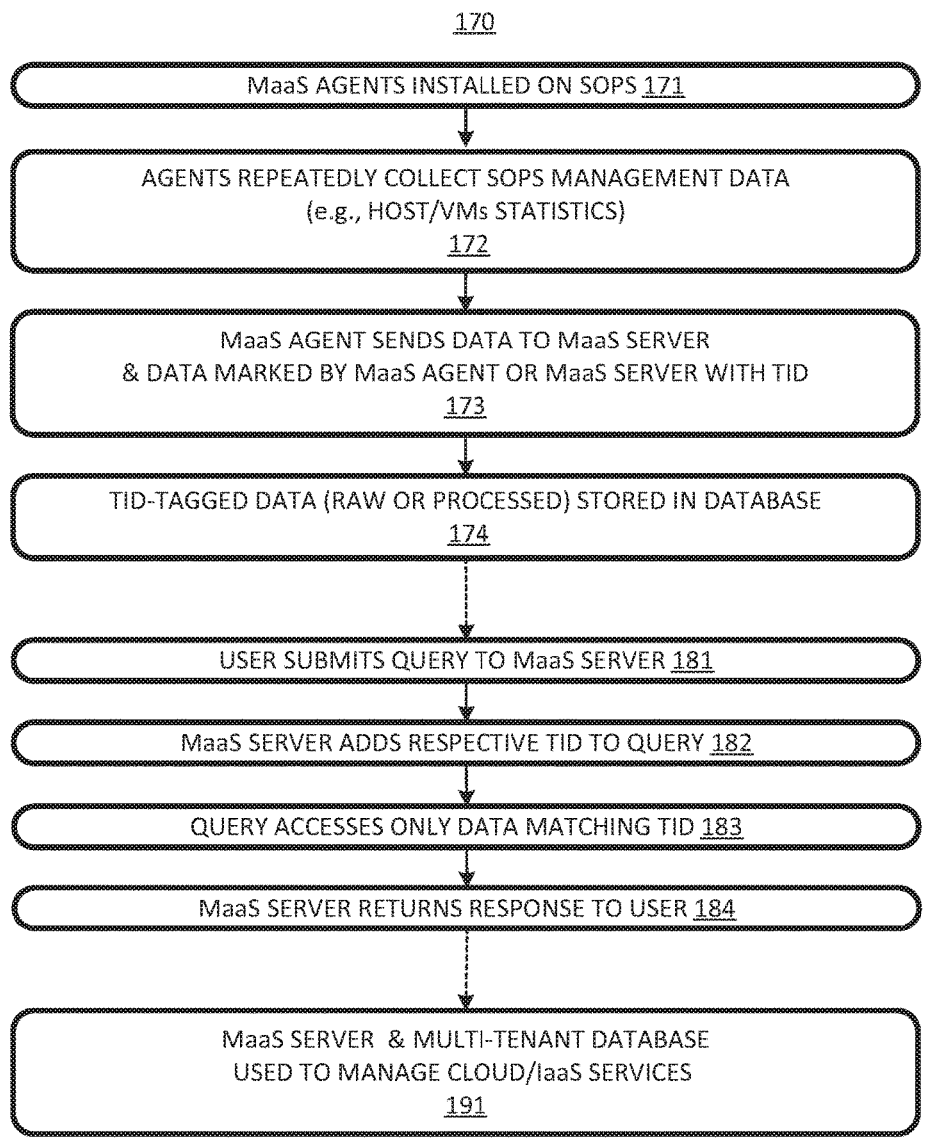
FIG. 1B is a flow chart of a MaaS process that can be implemented in the MaaS environment of FIG. 1A.

An information-technology (IT) management process 17, flow-charted in FIG. 1B, can be implemented in MaaS environment 100 and in other scenarios. At 171, the MaaS agent is installed on respective SOPS. If the MaaS agents are responsible for tagging management data with TIDs, then each MaaS agent is configured with the TID for the respective SOPS. This need not be the case for embodiments in which the MaaS server is responsible for tagging management data with TIDs.

At 172, the MaaS agents repeatedly (e.g., periodically) collect SOPs management data from the management targets of the respective SOPS. For example, the targets can include a hypervisor such as ESX, available from VMware; the hypervisor may collect management data for the virtual machines (VMs) it supports. The MaaS agent can then collect management data from the hypervisor. The data can include statistical data regarding VMs and the hardware host on which the hypervisor runs.

At 173, the management data is transmitted to the MaaS server. The management data can be tagged with the TID for the source SOPS. This tagging is performed by the MaaS agent in some embodiments and by the MaaS server in sortie embodiments in which the MaaS server can identify the source of the received management data. The management data can be raw time-profile data. Alternatively, the management data can be statistical data resulting from analysis by the management target (e.g., hypervisor), the MaaS agent, or by the MaaS server. Also, the management data can be time-stamped, e.g., by the management target, the MaaS agent, or the MaaS server.

At 174, the management data is stored in a multi-tenant database in association with respective TIDs. The data can be stored as received and/or processed by the analysis engine.

Once the multi-tenant database is populated, a user may submit a query to the MaaS server at 181, e.g., regarding management statistics relating to health, utilization, performance and configuration. At 182, the MaaS server, e.g., in conjunction with user authentication, tags the query with the TID of the subscriber of which the user is a member. At 183, the TID is used to permit access to management data in the multi-tenant database with matching TIDs and to preclude access to management data associated with other TIDs. At 184, the MaaS server returns a response to the user based on the accessed management data.

At 191, in the context of a hybrid cloud/on-prem arrangement, the MaaS server can use the multi-tenant database in the management of cloud/IaaS services. Of course, cloud-only and on-prem-only arrangements can be managed as well. Thus, allowing subscribers to migrate from one arrangement to another as needed without changing the management approach.

In the following embodiment, a Management-As-A-Service (MaaS) server communicates with a SOPS through its firewall using a reverse session-origination (RSO) tunnel. A remote user can access and manage the SOPS via the MaaS server. In addition, a MaaS agent residing on the SOPS can create the RSO tunnel, as well as collect and forward to the MaaS, metrics data regarding the SOPS, e.g., its virtual machines (VMs). The MaaS server stores the collected client-side data in a database, which can be queried by a user. In addition, an analysis engine on the MaaS server can analyze the stored client-side data and provide alerts and recommendations to a user. Depending on the scenario, the recommendations may be based on data from a single SOPS that the user is authorized to access, or may be based at least in part on data from plural SOPSs, including at least one that the user is not authorized to access.

Herein, a "tunnel" is a network channel in which packets of a "payload protocol" are encapsulated as payloads in packets of a "delivery protocol" in a manner not called for by an applicable Internet Protocol Suite. For example, while the Internet Protocol Suite would call for encapsulating a packet of an application layer protocol (e.g., the HyperText Transfer Protocol, abbreviated "HTTP"), as a payload in a transport layer protocol (e.g., Transmission Control Protocol or TCP), it would not call for encapsulating a TCP packet in an HTTP packet. Some embodiments herein employ tunnels in which TCP packets are encapsulated in HTTPS packets, where HTTPS ("HTTP Secure") is a secure variant of HTTP employing a Secure Sockets Layer (SSL) protocol or a Transport Layer Security (TLS) protocol. As is conventional, "SSL" is used herein to refer to both SSL and TLS protocols.

Although they provide for bi-directional communication between a client and a server, HTTP and HTTPS are examples of unidirectional session-origination protocols. Request-response sessions, i.e., sequences of requests and responses, are at least predominantly originated by client requests to a server. Thus, the forward direction for session origination is from client to server. The payloads, e.g., user requests and responses, may also have an associated direction of origination, which may be the same or opposite the direction of origination associated with the delivery protocol. If they are the same, the tunnel is a "forward session-origination (FSO) tunnel"; if they are opposite, the tunnel is a "reverse session-origination (RSO) tunnel". As the terms are used herein, bi-directional session-origination tunnels are neither FSO nor RSO.

Herein, a remote user initiates communication sessions by issuing requests, some of which may actually be commands. The SOPS responds to each request, e.g., by providing requested information or indicating that a user command has been implemented. So, remote user sessions originate server-side, i.e., outside the SOPS, and are directed to the SOPS. In other words, the direction of session origination for the delivery protocol is the reverse of the direction of origination of the user sessions. In this sense, the tunnels herein are reverse session-origination (RSO) tunnels.

RSO tunnels face a challenge as the user may not be on-premises with the SOPS that originates the session-originating delivery protocol requests. Accordingly, a MaaS agent can be installed on the SOPS to provide for user-less generation of delivery-protocol requests. The MaaS agent can also unwrap user requests from delivery protocol responses and forward the unwrapped user requests to their intended on-premises destination. The MaaS agent can also wrap responses to user requests in delivery-protocol requests. While the MaaS agent requires installation, the effort involved is comparable to installing an application, and is much less burdensome than setting up a SOPS for VPNs.

A surprising additional benefit of the client-side MaaS agent is that it can be used to form the tunnel itself by forwarding an on-premises port to a port on the MaaS server. The MaaS agent can be triggered to establish a connection between itself and an agent connection endpoint (ACE) on the MaaS server. The ACE, which would typically be co-developed with the MaaS agent, wraps user requests in delivery-protocol responses and unwraps user responses (to user requests) from delivery-protocol requests.

Another challenge for an RSO tunnel is that the MaaS server may have to wait until there is a pending delivery-protocol request before the MaaS server can forward a user request to the on-premises SOPS. This wait is in addition to any increased latency due to access being remote instead of local (i.e., from an on-premises user). So that the remote-user experience is not unduly degraded, the MaaS agent can act to minimize the duration of intervals during which no delivery-protocol request is pending. This can involve generating and transmitting dummy requests (e.g., bearing no information to be forwarded to the user); user requests can then be wrapped into responses to the dummy requests.

In some embodiments, the MaaS server simply wraps a user request into a delivery-protocol response. In other embodiments, some translation of the user request as received is involved. In further embodiments, the MaaS server performs more complex translations. For example, a user may request hourly processor utilization reports, in which case, the MaaS server may schedule user requests to be sent hourly. In still other embodiments, the MaaS server may generate its own "user requests" that are not in response to specific requests from a remote user. For example, a MaaS server may request that the MaaS agent monitor the SOPS and, to that end, generate probes for specific system health information regarding the SOPS. In summary, the services provided by a MaaS server can range from simple forwarding to complex artificial intelligence systems for monitoring and maintaining one or more SOPSs.

Remote (that is, off-premises and outside a SOPS firewall, users can connect to a MaaS server using an app or a web browser. The MaaS site can take care of authentication and authorization, prioritizing requests, and so on. The MaaS server can store network data collected by the MaaS agent. Herein, "network data" encompasses data collected from a network. Examples include total and per-VM hardware-resource utilization data and performance data. In addition, network data encompasses configuration data and configuration change data. The MaaS server can use artificial intelligence and other functionality to provide for automatic proactive management of the on-premises network.

Figure 2:
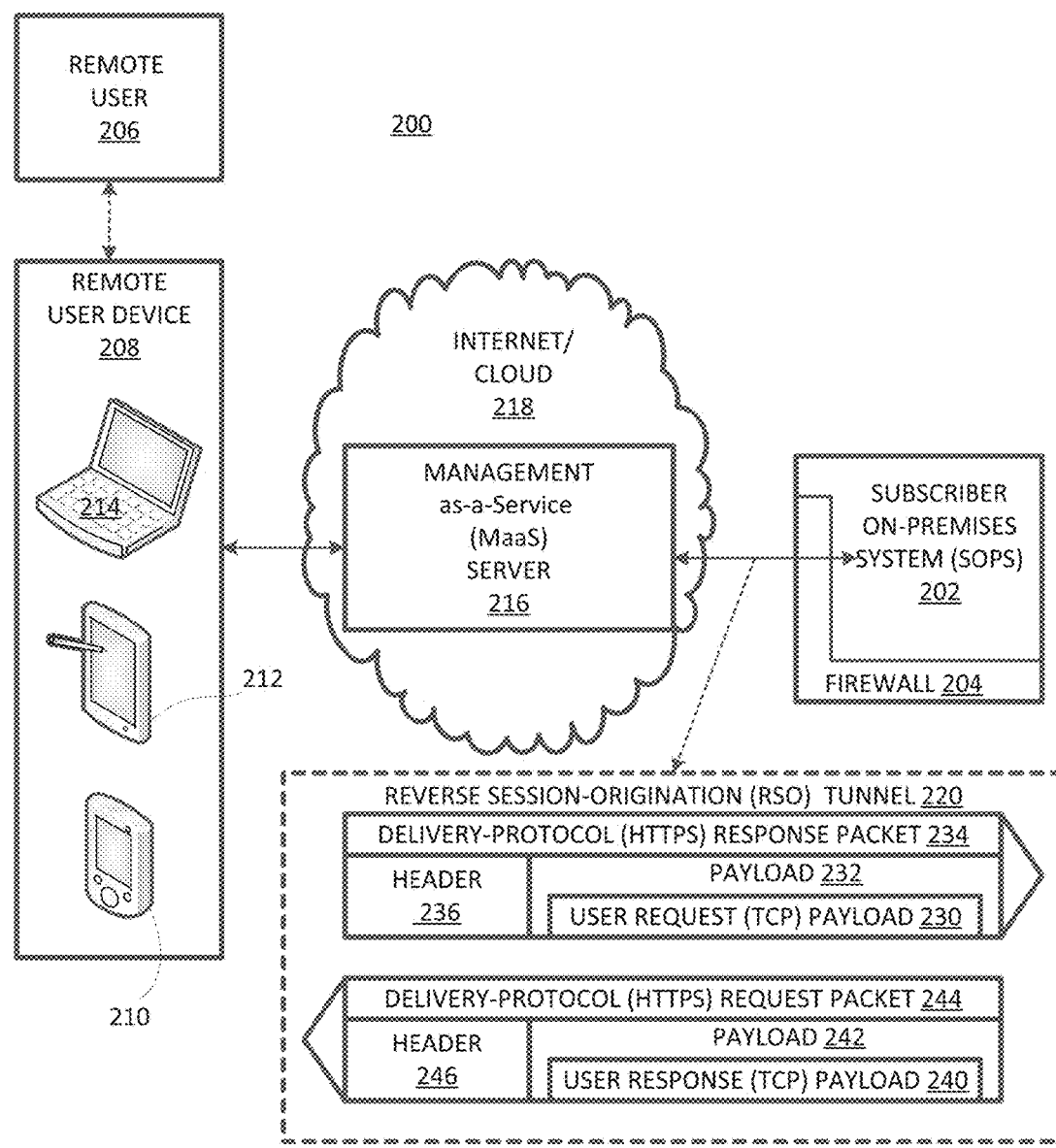
FIG. 2 is a schematic diagram of a MaaS environment in which a MaaS server communicates with a SOPS via a reverse session-origination (RSO) tunnel.

For example, a MaaS environment 200 can include an SMB-owned SOPS 202, as shown in FIG. 2. SOPS 202 includes a firewall 204 that allows Internet access, while protecting SOPS 202 from unauthorized access. A user 206, e.g., an owner or employee of the SMB, may obtain remote access using an app or web browser executing on a remote device 208, such as a smartphone 210, a tablet 212, or a laptop computer 214. Remote access to SOPS 202 is provided via an Internet-based MaaS server 216 located on the Internet/cloud 218 and outside firewall 204. The remote device 208 can access MaaS server 216 using an HTTPS protocol, a cellular protocol, or another protocol.

In various embodiments, a SOPS includes one or more computers. One or more of the computers may serve as a physical host for virtual machines, which may, in turn, run applications or other programs. To this end, a hypervisor or other virtual machine monitor may execute on the host hardware. In an embodiment, MaaS server 216 may host MaaS software for managing virtual machines executing in SOPS 202. Herein, the hosts, hypervisors, and virtual machines are all considered part of the SOPS.

MaaS server 216 can access SOPS 202 via an RSO tunnel 220. User sessions may be originated by the user at a user device 208. In that case, the MaaS server 216 may forward the user requests (modified or unmodified) to the SOPS 202 via RSO tunnel 220. Alternatively, MaaS server 216 may generate its own remote user requests destined for SOPS 202.

User requests can be packetized, and the user-request packets can be sent over RSO tunnel 220 to SOPS 202. The user requests can be conveyed according to a protocol understood by the intended, target within SOPS 202. In the illustrated embodiment, the user protocol is the TCP/IP transport layer TCP protocol. The payloads of the user request packets may be encapsulated as payloads of delivery-protocol packets. The delivery protocol can be, for example, HTTPS. As shown in FIG. 2, a user request (TCP) packet 230 can be encapsulated as a payload 232 of a delivery-protocol packet 234 that also includes a delivery-protocol header 236 (to specify, for example, an origin, a destination, and a session identifier). Upon receipt at SOPS 202, the user-request payload 230 is extracted, a TCP header is added, and the resulting TCP packet is transmitted to its destination within SOPS 202.

Similarly, a user response, generated by SOPS 202 in response to a user request, can be packetized into user-response packets destined for MaaS server 216 and/or user 206. Each user-response payload 240 can be wrapped as a payload 242 in a delivery-protocol request packet 244. In addition to the payload, the delivery-protocol request packet can include a header 246, for example, specifying an origin, a destination, and a session identifier. The delivery protocol request payload 244 is then transmitted to MaaS server 216 via RSO tunnel 220. However, to preserve tunnel bandwidth for incoming data, some outgoing data can be sent through a path that bypasses the RSO tunnel.

Upon receipt at server 216, the user-response payload 240 is extracted from the delivery-protocol request packet 244, a header is added, and the resulting user-response packet is consumed at MaaS server 216 and/or forwarded to and consumed by user 206.

In the illustrated embodiment, the delivery-protocol packet 234 includes, as its payload, only the payload of a payload-protocol packet 230. The payload-protocol header is not included as part of the delivery-protocol payload. The source and destination are determined by the tunnel itself, so the payload-protocol header is not needed to specify them. Omitting the payload protocol header in the delivery-protocol payload avoids certain potential address conflicts.

In summary, payload-protocol user requests are wrapped in delivery-protocol responses, and payload-protocol user responses are wrapped in delivery protocol requests. The user sessions originate as transmissions toward SOPS 202, while the delivery protocol sessions originate as transmissions from SOPS 202. Hence, the characterization of tunnel 220 as reverse session origination.

Figure 3A:
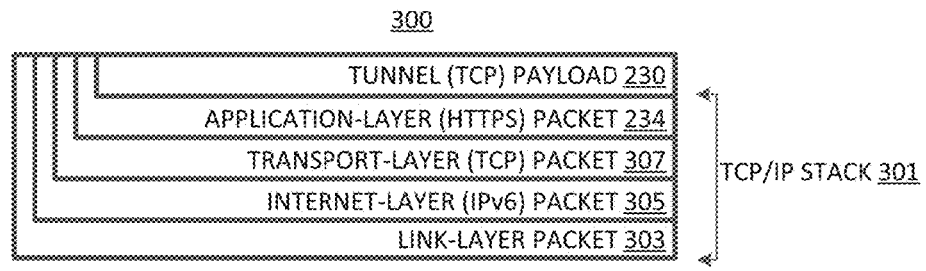
FIG. 3A is a schematic diagram showing a nested packet traversing the RSO tunnel of FIG. 2.

Note that the terms "delivery protocol" and "payload protocol" are defined relative to each other. For example, the HTTPS delivery protocol of FIG. 3A resides at the application layer of the Internet Protocol Suite, otherwise known as "TCP/IP". The Internet Protocol Suite defines a four-layer stack including: a link layer, an Internet layer, a transport layer, and an application layer. Tunneling contributes an additional layer, resulting in the 5-layer stack of FIG. 3A.

Thus, a tunnel stack 300 can have a link-layer packet 303 encapsulating an Internet-layer (e.g., Internet Protocol Layer version 6 or IPv6) packet 305. The Internet layer packet 305 can encapsulate a transport layer 307, e.g., TCP, packet 234. The transport layer packet 307 can encapsulate an application layer, e.g., HTTPS, packet 234. The application layer HTTPS packet 234 can include as its payload the payload of a TCP packet 230. To avoid confusion, it can be helpful to keep in mind that the tunnel TCP payload 230 is distinct from the transport-layer packet 307, despite the fact that they both may conform to the TCP protocol.

As explained above, a user request packet is encapsulated in a delivery-protocol response packet. However, the delivery-protocol response must refer to a previously generated delivery protocol request or to a session originated by a previously generated delivery-protocol request. In other words, a user request cannot be sent to the SOPS 202 (FIG. 2) until MaaS server 216 has received a corresponding delivery-protocol request. As a result, transmission of a user request can be delayed by the time spent waiting for a delivery-protocol request to be received from SOPS 202. By ensuring a practically continuous presence of a delivery-protocol request packet, RSO tunnel 220 minimizes this delay to near zero.

Figure 3B:
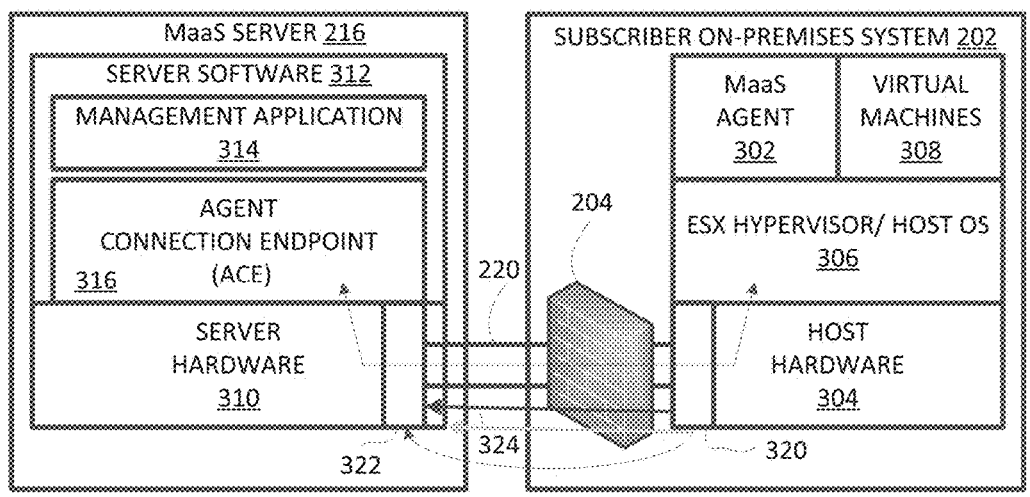
FIG. 3B is a schematic diagram of a MaaS server and a SOPS connected by the RSO tunnel of FIG. 2.

To provide the requisite requests, a MaaS agent 302, shown in FIG. 3B, is installed on SOPS 202. As shown in FIG. 3, SOPS 202 includes host hardware 304, a hypervisor 306 running on hardware 304, and virtual machines 308 running on hypervisor 306. Hypervisor 306 can be, for example, ESX, available from VMware, Inc. MaaS agent 302 runs on hypervisor 306. In other embodiments, the MaaS agent can run on a host operating system that is separate from the hypervisor or on a hypervisor that is separate from a host OS, or elsewhere. Depending on the embodiment, a MaaS agent and the virtual machines it helps in managing may run on the same on-premises physical host and/or on different on-premises physical hosts.

MaaS server 216 includes server hardware 310 and server software 312. Software 312 is software encoded in media included in server hardware 310. In the illustrated embodiment, server software 312 includes a management application 314 to provide management as a service (MaaS), and an agent connection point (ACE) 316. Management application 314 is used to manage virtual machines 308 via hypervisor 306. Hypervisor 306 can acknowledge that management commands have been implemented and can provide status information regarding virtual machines 308 in response to user requests therefor.

MaaS agent 302 can create RSO tunnel 220 by forwarding a client-side port 320 of SOPS 202 to a server-side port 322 of MaaS server 216. MaaS agent 302 can packetize, encrypt, wrap, and transmit user-response packets from hypervisor 306; this is one way to generate the request packets needed to transport user requests to SOPS 202. MaaS agent 302 can also unwrap, decrypt, and forward to hypervisor 306, user requests. MaaS agent 302 can also generate dummy packets to minimize the amount of time in which no delivery-protocol request is pending and to minimize the time a user request must wait before being wrapped and transmitted to SOPS 202. To preserve bandwidth for incoming communications, some data, e.g., health, utilization, and performance metrics data, can be sent from SOPS 202 to MaaS server 216 via a path 324 that bypasses tunnel 220, as firewall 204 is more permissive with outgoing communications than it is with incoming communications.

Figure 4:
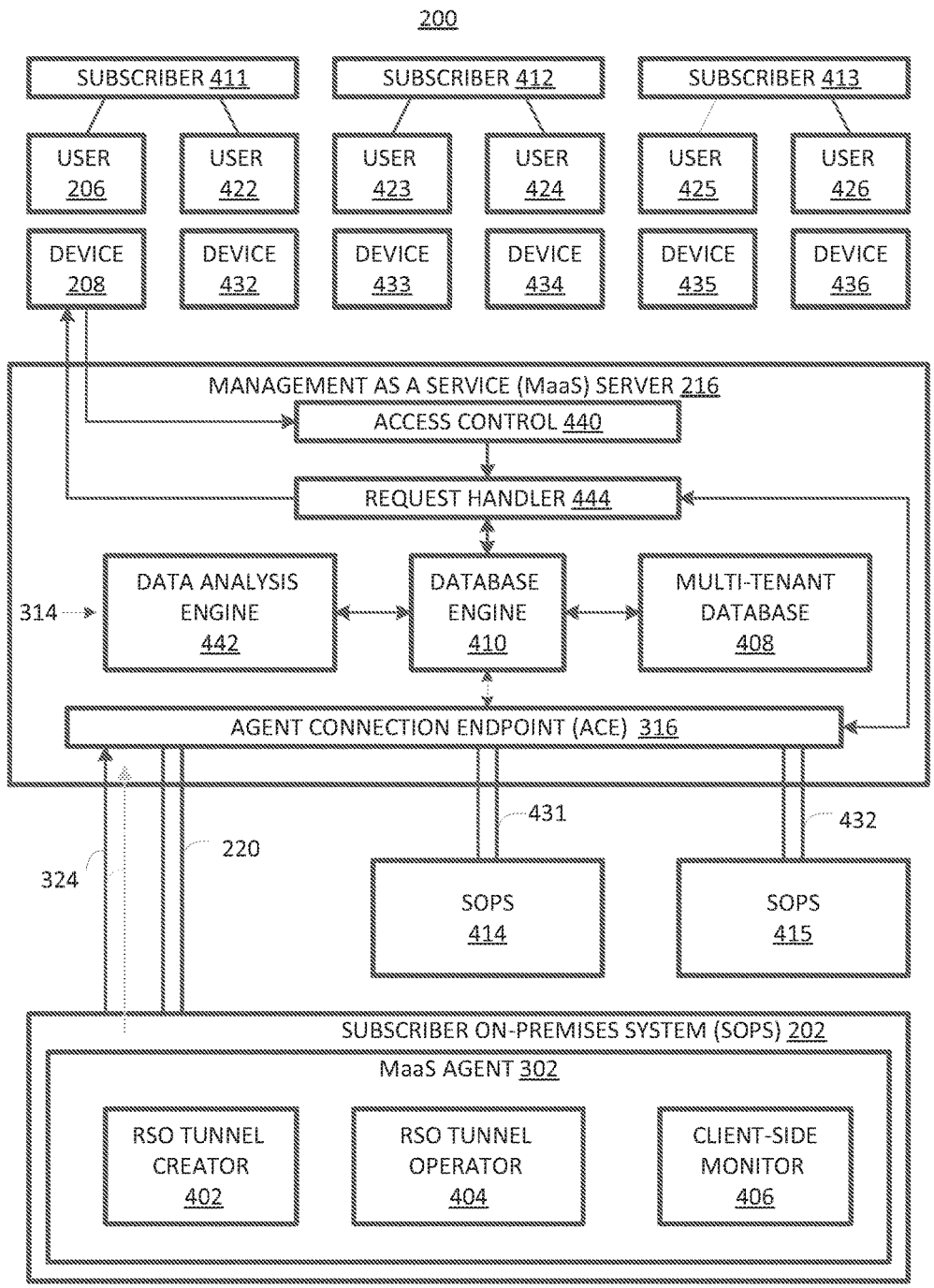
FIG. 4 is a schematic diagram of the MaaS environment of FIG. 2 showing additional details of the MaaS server and SOPS.

As shown in FIG. 4, MaaS agent 302 includes an RSO tunnel creator 402, an RSO tunnel operator 404, and a client-side network monitor 406. Once MaaS agent 302 is installed, tunnel 220 can be created, either upon launch, or in response to a command from an on-premises user. More specifically, MaaS agent 302 can forward, port 320 to ACE 316 to form tunnel 220.

Tunnel operator 404 can calibrate and operate RSO tunnel 220. Operator 404 can calibrate tunnel 220 by sending a calibration request, waiting for it to time out, and measuring the time it took for the request to time out. A threshold can be set as a percentage of the time-out duration. The time-out duration can be specified by dummy requests. If no user request is pending during the time-out duration, ACE 316 can send a dummy response to prevent a time-out. If a user request is pending, ACE 316 responds with the user request. If a user request is pending during a calibration request, ACE 316 responds with a user response; tunnel operator 404 can then send a new calibration request. Tunnel operator 404 can also send monitor and other client-side data to management server 216 either through tunnel 220 or alternate communications paths 324.

Client-side monitor 406 monitors SOPS 202, e.g., collects performance and utilization data from SOPS 202 and its components, e.g., virtual machines and their hosts. Utilization data can include percentage of available processor cycles being used, percentage of available bandwidth being used, and percent of storage device being used. Performance data can include the times required to perform certain tasks or the latencies involved in performing certain tasks. In addition, client-side monitor 406 can obtain configuration data from configuration change logs and health data from error logs. A user can specify the data to be collected and the schedule according to which data is collected. In the illustrated embodiment, the hypervisor collects and time-stamps the data such that utilization and performance can be specified on a per-VM basis. Management agent 302 adds a TID to the collected client-side data so that it can be distinguished from client-side data collected from other SOPSs.

The collected data can be forwarded via tunnel 220 to management application 314. Upon receipt by ACE 316, the collected data is stored in a multi-tenant database 408 of management application 314 via a database engine 410, shown in FIG. 4.

As indicated by FIG. 4, MaaS server 216 can serve multiple subscribers 411, 412, and 413. A subscriber may be a business, a business division, or another entity. Each subscriber can have one or more SOPSs 102, 414, and 415. Typically, each SOPS belongs to a respective subscriber. By analogy with IaaS services, a subscriber identifier is referred to as a tenant identifier (TID). If two SOPSs share the same subscriber, the same TID can be used as the client identifier for both SOPSs. Alternatively, separate TIDs can be used for the SOPSs. In that case, the two TIDs are both assigned to the same subscriber.

"Multi-tenancy" is an architecture in which a single instance of a software application, in this case, management application 314, serves multiple subscribers. Each subscriber is called a tenant. Tenants may be given the ability to customize some parts of the application, such as color of the user interface (UI) or business rules, but, typically, they cannot customize the application's code. Multi-tenancy can be economical in part because software development and maintenance costs are shared.

Each subscriber-tenant can have one or more users 206, 421, 422, 423, 424, 425, 426, and 427 that can access MaaS server 216 using a respective user device, e.g., device 208. MaaS server 216 can communicate with respective SOPSs 202, 414, and 415, via respective sets of tunnels 220, 431, and 432. For example, a subscriber may be an SMB and the users can be its employees.

MaaS server 216 includes an access control 440 for authenticating users. The authentication process determines the subscriber (e.g., SMB or department) to which a user belongs. Access control 440 modifies queries and commands by inserting a TID unique to the subscriber to which the user belongs.

Management application 314 includes an analysis engine 442 that can analyze data in database 408 on an ongoing basis. In other words, analysis engine 442 can monitor database 408 for indications of conditions requiring intervention and can notify a user of the same. For example, a subscriber can specify that an email or a Short Message Service (SMS) notification should be sent to a specified user whenever a virtual machine uses 90% or more of its available processor capacity. The subscriber can then assign or purchase additional capacity, reduce the workload, etc.

In addition, analysis engine 442 can be used to detect data trends, e.g., for capacity planning purposes. Analysis engine 442 can also serve as an expert system making recommendations, e.g., anticipating failures and helping to prevent them. For example, higher error rates and more frequent communications retry events may be used to anticipate component failures. Analysis engine 442 is configurable on a per-subscriber basis. Each subscriber can specify thresholds to be detected and alerts to be sent.

Analysis engine 442 has access to data from all subscribers. In principle, analysis engine 442 can provide recommendations based in part on data other than the data for the subscriber benefitting from the data. For example, problems reported in response to an operating-system upgrade for subscriber 411 can be the basis of a warning to subscriber 412 to delay the upgrade, e.g., until the problems have been resolved.

For further assurances, subscribers would be required to provide permission to use their data to enhance the general knowledgebase. Incentives include a reciprocal benefit of the community knowledgebase. Also, a subscriber that did not share data might be allowed to pay a higher fee to obtain the benefits of the community knowledgebase. A request handler 444 manages sessions with users in that it matches responses from SOPS 202 to their corresponding requests.

Figure 5:
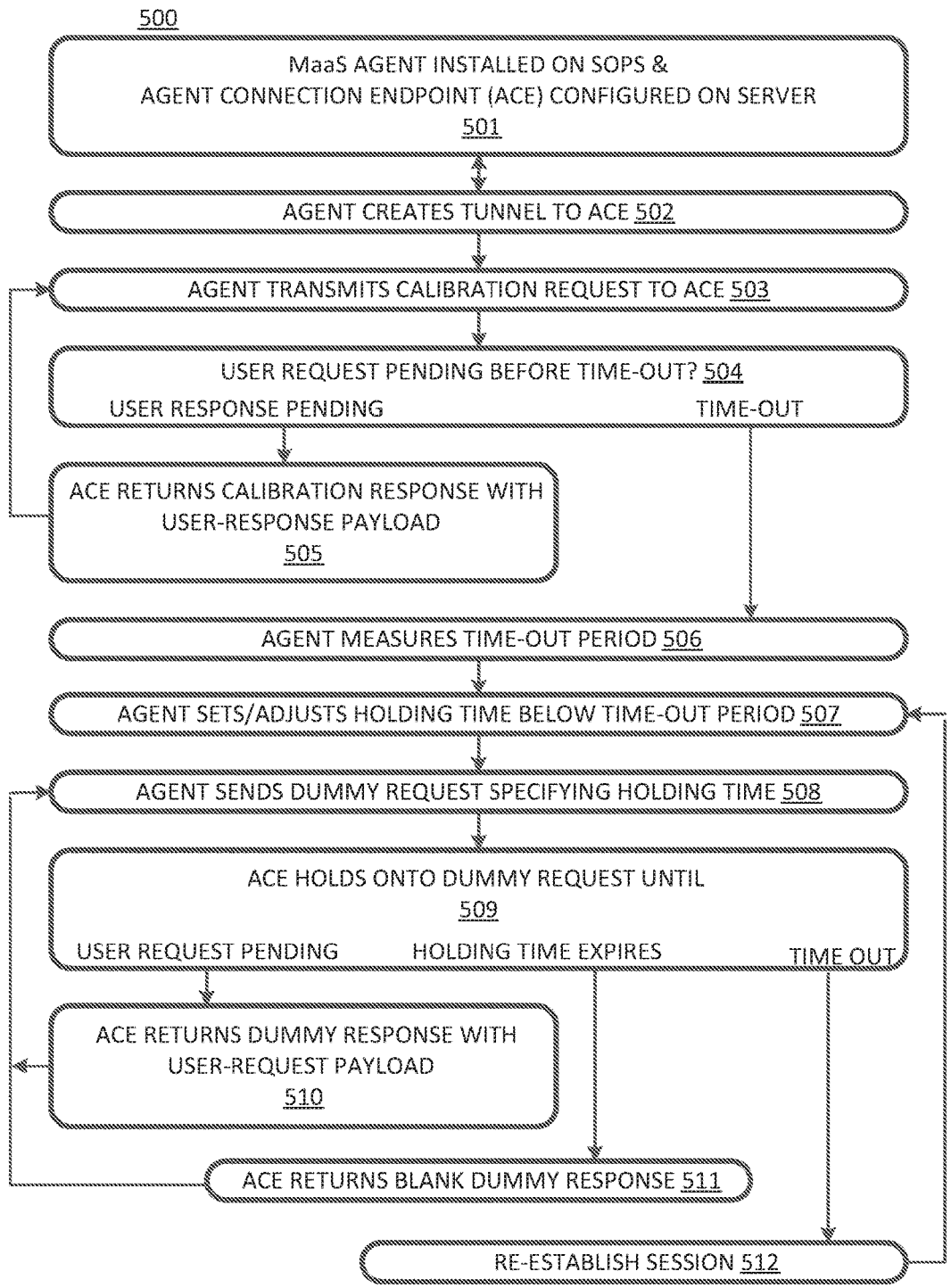
FIG. 5 is a flow chart of a process for setting up an RSO tunnel such as the RSO tunnel of FIG. 2.

A process 500, flow-charted in FIG. 5, provides for setting up an RSO tunnel so that a firewall-protected SOPS can receive user requests over the Internet. At 501, a MaaS agent is installed on the SOPS, and an agent connection endpoint (ACE) can be configured on a MaaS server. The server can be Internet-based, e.g., outside a firewall for the SOPS. The configuration of the ACE may occur before, after, or concurrently with installation of the MaaS agent at 501.

At 502, the MaaS agent forwards a port to the server to establish a tunnel. This allows the Internet-based MaaS server to connect to a specific service on the private SOPS. The forwarded port can be web-services (HTTP) port 80; this port can be forwarded to a port of the server associated with the ACE. The host for the forwarded port can then act as an HTTP server, while the ACE can function as its client. Thus, for the resulting tunnel, sessions originate at the SOPS and are directed from the SOPS to the server.

The RSO tunnel has an associated payload protocol, in this case TCP, and an associated TCP/IP application-layer delivery-protocol, in this case HTTPS. In other embodiments, other payload protocols and other application-layer delivery protocols are used. In some embodiments, the payload protocol and the delivery protocol are the same; for example, they can both be HTTP or HTTPS.

At 503, the MaaS agent transmits a calibration request to the ACE. The calibration request can be a dummy request. At 504, a determination is made whether a user request is pending (at the ACE) before the calibration request times out. If a user request is pending, either because it was received before the calibration request is received, or because it is received as or after the calibration request is received but before time out, then, at 505, the ACE returns a calibration response with the user request as payload to the MaaS agent. At this point, process 500 returns to action 503, with the MaaS agent transmitting a new calibration request.

If instead, at 504, the calibration request times out, the ACE will notify the MaaS agent of the timeout. At 506, the MaaS agent measures the "time-out period", i.e., the time between calibration-request transmission and detection of the time-out. A request-response session can be terminated by a time-out, e.g., imposed by an Internet Service Provider (ISP), a firewall (if any), or an HTTP proxy (if any). If a session is terminated, it can be re-established using a handshake process that consumes plenty of processor cycles, and requires multiple packet round-trips. As a result, bandwidth consumption and latency increase. The MaaS agent has no reliable means of knowing the time-out period a priori, so the time-out period is determined empirically.

At 507, the MaaS agent sets a "holding time" for the ACE to hold a dummy request before responding to it. The goal is to ensure practically continuous pendency of dummy requests while minimizing the amount of tunnel bandwidth consumed by the dummy requests and the responses thereto. Longer holding times mean fewer dummy requests per unit time, but risk interruptions due to time outs. Shorter holding times reduce the risk of time outs, but increase tunnel traffic. In the illustrated embodiment, the response-time limit can be set as a percentage (e.g., 90%) of the time-out period. In the illustrated embodiment, holding times are usually between 10 seconds and 10 minutes.

At 508, the MaaS agent sends a dummy request, specifying the holding time, to the ACE. At 509, the ACE holds onto the dummy request until: 1) there is a user request pending, 2) the holding time expires, or 3) there is a time out. If there is a user request pending, the ACE returns a dummy response with the user request as its payload at action 510. If the user request is pending when the ACE receives the dummy request, the response is as immediate as possible. If the user request is received during the holding time, the dummy response is sent as soon as possible after receipt of the user request. If the holding time expires without receipt of a user response, at 511, the ACE returns a blank (no user request in the payload) response to the MaaS agent. Whether or not the dummy response includes a user request, process 500 returns to action 508 immediately to minimize the time a subsequent user request must wait before being forwarded to the SOPS.

If, at 509, the dummy request times out before a user request is received and before the holding time expires, the session may be re-established at 512. Once the session is re-established, the MaaS agent can adjust, at 507, the holding time downward to reduce the likelihood of interruption due to time outs.

Figure 6:
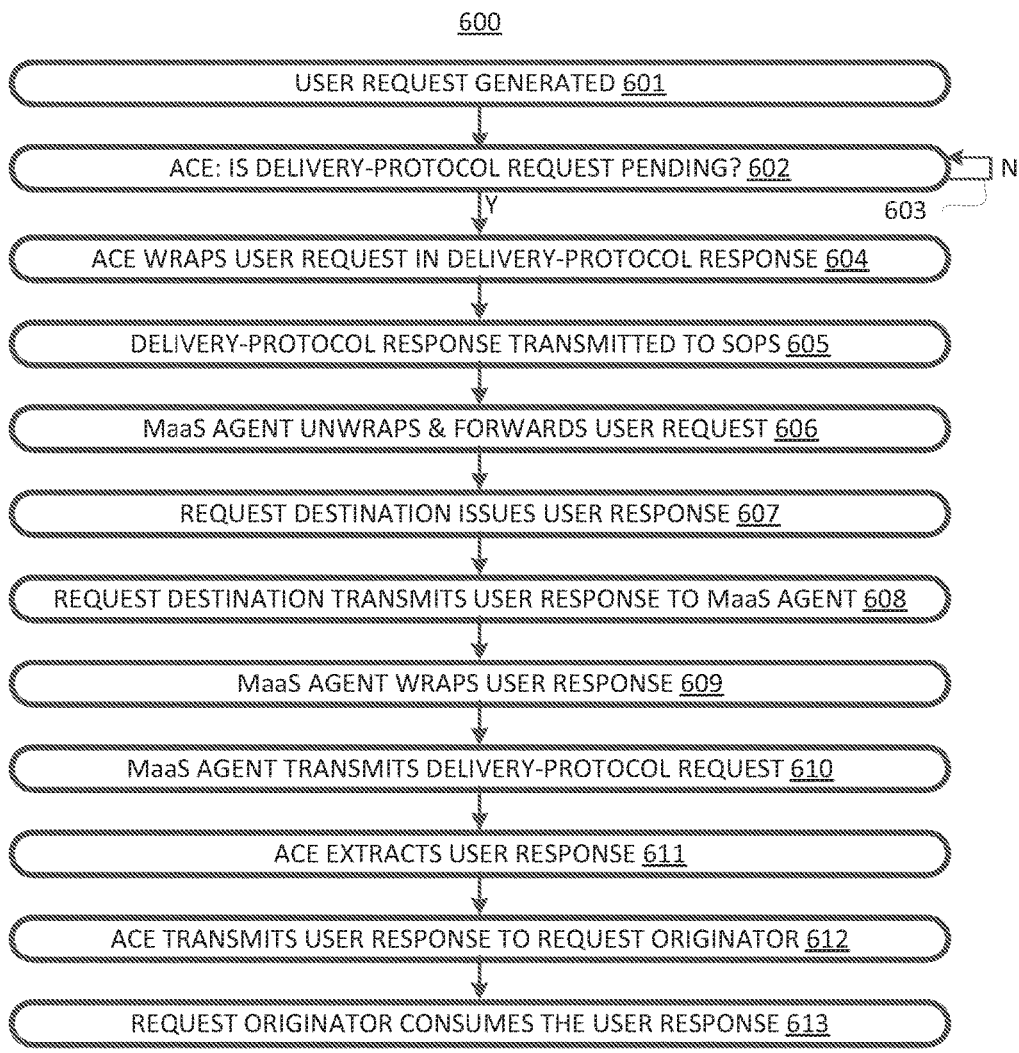
FIG. 6 is a flow chart of a process for handling a user request using the RSO tunnel of FIG. 2.

Process 500 is designed to optimize the user experience by minimizing any delay associated with remote (vs. local) access via a tunnel of a SOPS. The handling of a session initiated by a remote user is represented in FIG. 6 as process 600.

At 601, a user request is generated (asynchronously and independently of delivery-protocol request generation). For example, a user can interact with an app or web browser on a user device to generate a request and transmit it to the MaaS server. The server may forward the user requests "as is" or modify them before sending them one "Modifying" can include translating from one format to the other, scheduling a series of modified user requests in response to a single user request, and other modifications, e.g., by a management or other application executing on the MaaS server.

At 602, the ACE determines whether or not a delivery-protocol request is pending locally. If not, the ACE waits before proceeding to action 604, as indicated by the loop-back arrow 603. Process 500 (FIG. 5) ensures this wait is brief. Once a delivery-protocol request is pending, then, at 604, the ACE wraps the user request in a delivery-protocol response to the pending delivery-protocol request. As suggested earlier, this can involve wrapping user request packet payloads as payloads in delivery-protocol packets.

The user request can be packetized and included as payloads in delivery-protocol response packets that identify the SOPS port as a destination and identify a session associated with a prior delivery-protocol request. The delivery-protocol packets can be encrypted, e.g., according to an applicable transport-layer security (TLS, SSL) protocol. At 605, the delivery-protocol response (encapsulating user requests) is transmitted through the RSO tunnel to the SOP.

At 606, the MaaS agent unwraps the user request and forwards it to their intended management target, e.g., a hypervisor, on the SOPS. This can involve decrypting the payload, and appending a header to form a complete TCP packet. The header can specify the TCP packet destination as the destination is fixed and known by the MaaS agent. The header can specify the source of the encapsulating HTTPS packet as the source for the TCP use-request packet. The intended management target may respond, e.g., by turning a virtual machine on or off as called for by the user request.

At 607, the management target, e.g., the hypervisor, can issue a user response (that is, a response to a user request), typically in the same protocol as the user request. The user response may indicate that the management target that the user request has (or has not) been fulfilled; also the user response may include information called for by the user request. The management target can transmit the user response to the MaaS agent at 608.

At 609, the MaaS agent wraps the user response in a delivery-protocol request. This wrapping can involve stripping the header from TCP packets and encrypting the payload. At 610, the MaaS agent transmits the delivery-protocol request (that encapsulates the user response) to the ACE on the MaaS server.

At 611, the ACE extracts (unwraps) the user response from the delivery-protocol request. This can involve generating a header and appending it to the TCP payload. At 612, the ACE transmits the user response to the request originator, e.g., to its destination on the server. At 613, the request originator (the MaaS server or user device) consumes the user response. In other words, the server consumes and/or forwards (to the user via a user device) the user response. Depending on the scenario, a session can have additional round-trip request-response transactions.

Figure 7:
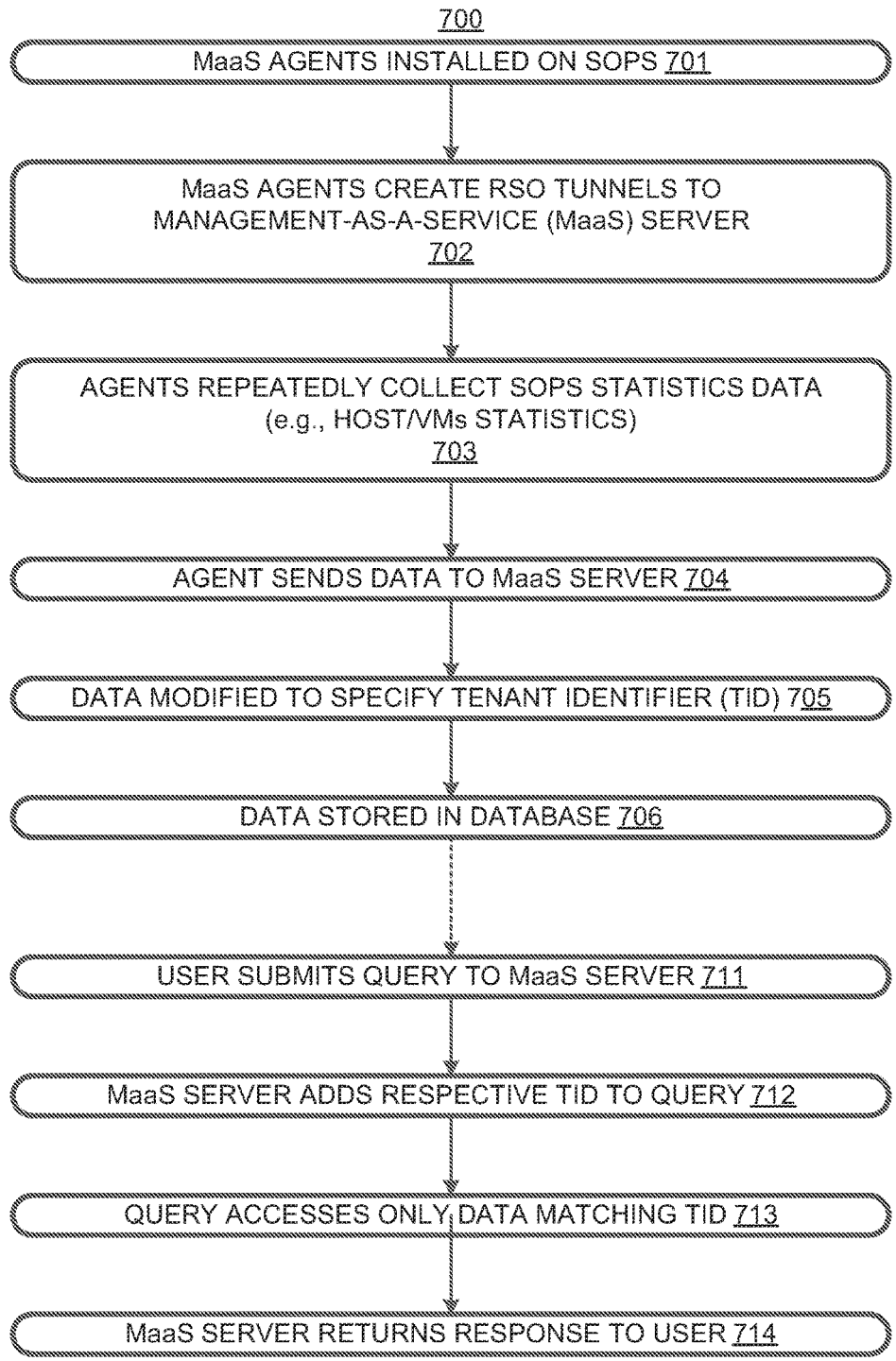
FIG. 7 is a flow chart of a process in which a user submits a query to the MaaS server of FIG. 2.

A MaaS process 700 is flow-charted in FIG. 7. At 701, MaaS agents are installed on one or more SOPSs. At 702, the agents create RSO tunnels to MaaS servers. At 703, the agents repeatedly collect SOPS statistics data, e.g., to detect patterns and trends. Different schedules may be used for different SOPSs. At 704, the agents send the collected SOPS data over the RSO tunnels or paths that bypass the RSO tunnels to the MaaS server. At 705, the MaaS server modifies the queries to include respective TIDs. At 706, the modified data is stored in a database residing on the MaaS server and/or outside the SOPS and accessible by the MaaS server.

At 711, a user submits to the MaaS server a query, e.g., regarding process utilization by a virtual machine running on a SOPS that the user is authorized to manage. At 712, the MaaS server, e.g., in connection with an authentication process, adds the respective TID to the query. This has the effect that only data records having the matching TID are accessed in responding to the query at 713. At 714, the MaaS server returns a response to the user. The response is based on data collected from the respective SOPS and is not based on data collected from other SOPSs associated with different TIDs.

Figure 8:
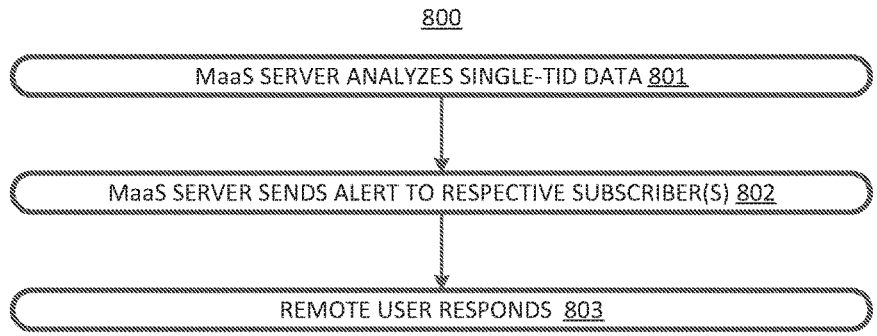
FIG. 8 is a flow chart of a process by which the MaaS server of FIG. 2 provides alerts and other messages to a remote user.

The database can be accessed not only by users, but by a resident (to the MaaS server) analysis engine, as in process 800, flow-charted in FIG. 8. At 801, the analysis engine analyzes the network data for a given SOPS. For example, process, network, and storage utilization can be analyzed on a per-VM basis. At 802, the MaaS can issue messages, e.g., alerts to a user or subscriber, if some threshold or other criterion is met. In addition, time profiles for each parameter can be used to predict patterns and trends. These, in turn, can be used to send messages with predictions, for example, regarding how long a virtual machine can operate unimpaired before capacity constraints throttle it.

At 803, a remote user can respond to an alert, a recommendation, or a notice that an automated action has been taken, without having to await a return to the client premises. This can be important where the message calls for a prompt response. The response may include a request to the MaaS application and/or to the SOPS. Communication over the tunnel can be required when interacting with on-premises hosts (e.g., for powering on or deleting VMs). However, action 803 provides for any kind of user action, regardless of whether or not it needs to go over the tunnel. For example, a response that does not need to go over the RSO tunnel is a user snoozing an alert because it can be resolved at a later time, in which case the MaaS server does not need to do anything except to resurface the alert in the future.

In an alternative embodiment, the message is sent to the SOPS instead of or in addition to a user or a subscriber. For example, a subscriber may provide policies for automated responses to detected conditions. For example, there may be a policy that, if the MaaS application detects high utilization by a VM running on a first host, the MaaS server may send a command to activate a second instance of the VM on a second host.

Figure 9:
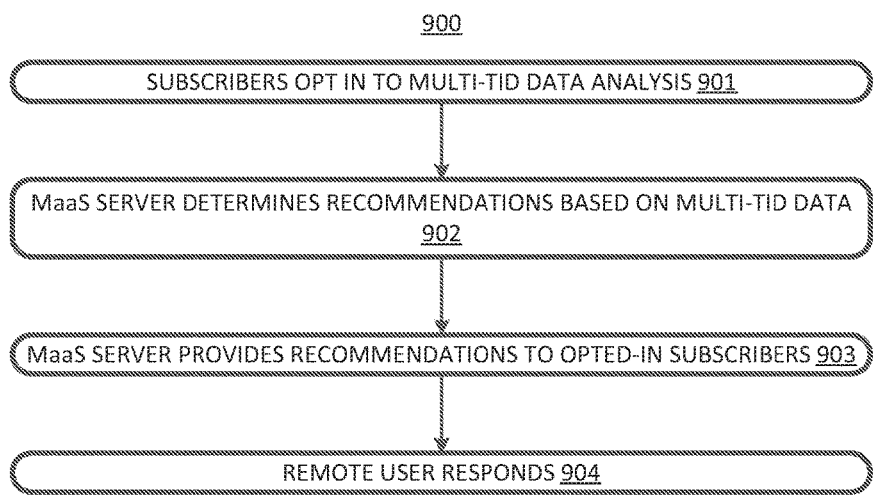
FIG. 9 is a process by which the MaaS server of FIG. 2 provides recommendations using data collected from plural SOPSs.

In process 800, the analysis engine accesses data from a single SOPS. However, one advantage of a MaaS implementation is that data belonging to multiple tenants can be used to provide enhanced recommendations, as in process 900, flow charted in FIG. 9. At 901, plural tenants of a MaaS system elect to participate in a multi-tenant recommendation feature. In consideration for the enhanced recommendations, the electing subscribers may give permission to use their data, or pay for a higher level of service without sharing their own data. At 902, the MaaS server, e.g., its analysis engine, analyzes data belonging to multiple subscribers to determine recommendations for a selected one of the subscribers. At 903, the MaaS server provides the recommendation to the respective subscriber. At 904, a user can respond as in action 803 above for process 800 (FIG. 8).

Herein, an "application programming interface" (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising the interface. An API port is a communications node for communication with an associated application or protocol. In the illustrated embodiment, the port to be forwarded has the number 80, which is conventionally assigned to the HTTP protocol.

In general, an API port can have a numerical identifier and can be addressed by combining an IP address for the application host with the port number for the application itself. A command line string or other technique can be used to forward one port, e.g., the HTTP port on a physical host of the SOPS, to another, e.g., the port associated with the ACE on the MaaS server. The result is a tunnel having a delivery protocol such as HTTP or HTTPS.

Herein, a "tunnel" is a communications channel of a network that includes a hardware layer and encapsulates packets or portions thereof conforming to a first "payload" protocol within packets conforming to a second "delivery" protocol compatible with the network. Herein, the delivery protocol is a TCP/IP application-layer protocol. Herein, "wrapping a request" and "wrapping a response" encompass wrapping on a packet-by-packet basis.

Herein, a subscriber on-premises system or "SOPS" is a computer or other information-technology system to which a subscriber, e.g., of services, has physical access. In contrast, a subscriber to cloud services would not, in general, have physical access to a computer system hosting cloud services. Depending on the embodiment, the SOPS can include one or more physical servers or other computers. The computers of a SOPS may be arranged in a local-area network (LAN) or a wide-area network (WAN). The SOPS may include wireless networking or wired networking or both. Physical servers may host virtual machines supported by various virtualization technologies.

The MaaS server may be a simple forwarding service for remote user requests or may include an application that responds in simple or complex ways to user requests, generating its own user requests in response to remote user requests or acting autonomously. The MaaS server may support MaaS applications. The payload protocol for the RSO tunnel will depend on the protocol expected by the payload destination on the SOPS. The MaaS server may include a standalone or other hardware computer, a network of servers operating as a single server, or a partition of a physical server, and/or virtual machines running on any of the above.

Herein, a "system" is a set of interacting elements, wherein the elements can be, for example, devices, atoms, actions, and other systems. Herein, a "process" is a system in which the elements are actions.

Herein, a "computer" is a system including storage media, at least one processor, and communications devices. The communications devices provide for receiving and transmitting physical representations of data. The storage media is used for storing physical representations of data. The processor is for processing some "data-type" data in accordance with "instruction-type data".

Herein, "virtual" means not physically existing as such but made by software to appear to do so. For example, a "virtual computer" is not a "real" computer (it lacks hardware), but appears to software running on it as though it were a computer. A "virtual machine" is a virtual computer and is not a machine. Herein, a "server" is a real computer that provides services to one or more other real or virtual computers, which are "clients" of the server.

Herein, a "network" is a system including at least one computer and at least one communications channel over which it can communicate with another computer or device. Herein, a "firewall" is a functional element that controls communications to and from a network. Portions of a network protected by a firewall are said to be "behind" the firewall. Typically, a firewall is configured to allow the network transmit communications, while limiting access to the network from outside the network. Typically, a firewall is configured to allow outgoing communications, e.g., a request from a client inside the firewall to a server outside the firewall, but to limit or block incoming communications unless they are in response an outgoing communication.

The Hypertext Transfer Protocol (HTTP) is a widely-used computer communications protocol in which an HTTP client issues requests to an HTTP server and the HTTP server returns responses to the client. Typically, a firewall allows outgoing HTTP requests, allows incoming responses to the outgoing HTTP requests, and blocks incoming HTTP requests. Herein, "client-side" means "behind the firewall". "SOPS" refers to a subscriber on-premises system and all components thereof that a firewall is (at least presumably) configured to protect.

Strictly, "data" is abstract information that can be represented physically, e.g., by tangible memory states and voltage levels. As shorthand used here, "data" can refer to the physical representations of data. "Statistics data" herein refers to data that collectively can be analyzed to detect patterns and/or trends. For example, values of a parameter collected at different times constitute statistics data. Herein, "client statistics data" refers to statistics data collected on the client side of a firewall. The statistics data can include data regarding virtual machines and their hosts that are regarded as part of the SOPS.

Herein, a "subscriber" is an entity that is the beneficiary of MaaS services under an agreement and that has functional possession of a SOPS or subscriber application. The subscriber may have possession as an owner or lessee of the SOPS. The subscriber may be a business or a department of an enterprise. Users authorized to manage the network are typically employees of the subscriber or people otherwise associated with the subscriber. Herein, a "tenant identifier" or "TID" is an identifier that identifies a subscriber to cloud-based IaaS services; however, the TED is also used to identify a MaaS subscriber for managing a SOPS.

These and other variations upon and modifications to the illustrated embodiments are provided for by the present invention, the scope of which is defined by the following claims.

What is claimed is:

1. An information-technology management process comprising:
   executing Management-as-a-Service (MaaS) agents on respective subscriber on-premises systems (SOPSs), each SOPS system including a firewall, each SOPS including a management target and a computer behind the firewall, the computer hosting the respective MaaS agent;
   collecting, by each MaaS agent, collected management data from the respective management target, the management data including health, utilization, or performance statistics;
   transmitting and tagging the collected management data, the transmitting including transmitting collected management data from respective SOPS to a MaaS server, the tagging including tagging the respective collected management data with a respective tenant identifiers (TIDs), such that different TIDs correspond to different SOPSs;
   storing stored management data in a multi-tenant database in association with respective TIDs, the stored management data being the same as or derived from the collected management data;
   receiving database queries from respective managers of respective SOPS;
   tagging the queries with TIDs for the respective SOPS;
   for each query, accessing data in the multi-tenant database tagged with the same TID that the query is tagged with, and not accessing data in the multi-tenant database tagged with TIDs but not with the TID with which the query is tagged;
   returning to respective managers, query responses based at least in part on the respective data accessed from the multi-tenant database;
   transmitting a user request from the MaaS server to a respective SOPS via a respective reverse-session-origin (RSO) tunnel, the transmitting including wrapping the user request in a delivery protocol response, the delivery-protocol response referring to a previously initiated delivery-protocol request or session.

2. The information-technology management process of claim 1 wherein the management targets include a hypervisor and the management data includes data relating to the health, utilization, or performance of a computer hosting the hypervisor and of at least one virtual machine hosted by the hypervisor.

3. The information-technology management process of claim 1 wherein the MaaS agents tag management data with respective TIDs.

4. The information-technology management process of claim 1 wherein the MaaS server tags management data with respective TIDs.

5. The information-technology management process of claim 1 further comprising the MaaS server forwarding a request from a SOPS manager to the respective SOPS via the RSO tunnel.

6. The information-technology management process of claim 5 wherein the RSO tunnel is formed by the MaaS agent.

7. The information-technology management process of claim 1 further comprising: storing management data for cloud-based subscriber applications in association with respective TIDs in the multi-tenant database.

8. A computer program product comprising a non-transitory medium encoded with code that, when executed by a processor, implements a process including:
    executing Management-as-a-Service (MaaS) agents on respective subscriber on-premises systems (SOPSs), each SOPS system including a firewall, each SOPS including a management target and a computer behind the firewall, the computer hosting the respective MaaS agent;
    collecting, by each MaaS agent, collected management data from the respective management target, the management data including health, utilization, or performance statistics;
    transmitting and tagging the collected management data, the transmitting including transmitting collected management data from respective SOPS to a MaaS server, the tagging including tagging the respective collected management data with a respective tenant identifiers (TIDs), such that different TIDs correspond to different SOPSs;
    storing stored management data in a multi-tenant database in association with respective TIDs, the stored management data being the same as or derived from the collected management data;
    receiving database queries from respective managers of respective SOPS;
    tagging the queries with TIDs for the respective SOPS;
    for each query, accessing data in the multi-tenant database tagged with the same TID that the query is tagged with, and not accessing data in the multi-tenant database tagged with TIDs but not with the TID with which the query is tagged;
    returning to respective managers, query responses based at least in part on the respective data accessed from the multi-tenant database;
    transmitting a user request from the MaaS server to a respective SOPS via a respective reverse-session-origin (RSO) tunnel, the transmitting including wrapping the user request in a delivery protocol response, the delivery-protocol response referring to a previously initiated delivery-protocol request or session.

9. The computer program product of claim 8 wherein the management targets include a hypervisor and the management data includes data relating to the health, utilization, or performance of a computer hosting the hypervisor and of at least one virtual machine hosted by the hypervisor.

10. The computer program product of claim 8 wherein the MaaS agents tag management data with respective TIDs.

11. The computer program product of claim 8 wherein the MaaS server tags management data with respective TIDs.

12. The computer program product of claim 8 wherein the process further includes the MaaS server forwarding a request from a SOPS manager to the respective SOPS via the RSO tunnel.

13. T The computer program product of claim 12 wherein the RSO tunnel is formed by the MaaS agent.

14. The computer program product of claim 8 wherein the process further includes: storing management data for cloud-based subscriber applications in association with respective TIDs in the multi-tenant database.

* * * * *